United States Patent
Kim et al.

[11] Patent Number: 5,946,405
[45] Date of Patent: Aug. 31, 1999

[54] BLOCK-MATCHING MOTION ESTIMATION APPARATUS UNDER USE OF LINEAR SYSTOLIC ARRAY ARCHITECTURE

[75] Inventors: Jin Woong Kim; Do Nyon Kim; Kang Whan Lee; Dong Hyun Kwon; Jin Suk Kwak; Ki Chul Kim, all of Daejeon, Rep. of Korea

[73] Assignees: Korea Telecommunication Authority, Daejeon, Rep. of Korea; Telecommunications Research, Seoul, Rep. of Korea

[21] Appl. No.: 08/761,205

[22] Filed: Dec. 6, 1996

[30] Foreign Application Priority Data

Dec. 23, 1995 [KR] Rep. of Korea ............ 95 55839

[51] Int. Cl.⁶ .................. G06K 9/00; G06K 9/36; G06K 9/46; G06K 9/54
[52] U.S. Cl. .................. 382/107; 382/303; 382/236
[58] Field of Search .................. 382/303, 304, 382/302, 236, 107; 348/665, 402, 413, 415, 416, 699, 700

[56] References Cited

U.S. PATENT DOCUMENTS

| | | | |
|---|---|---|---|
| 5,142,361 | 8/1992 | Tayama et al. | 348/416 |
| 5,200,820 | 4/1993 | Gharavi | 348/416 |
| 5,212,548 | 5/1993 | de Haan et al. | 348/416 |
| 5,249,037 | 9/1993 | Sigiyama et al. | 348/665 |
| 5,541,660 | 7/1996 | Kim et al. | 348/416 |
| 5,659,780 | 8/1997 | Wu | 395/800.19 |
| 5,696,836 | 12/1997 | Yoshino et al. | 382/107 |

FOREIGN PATENT DOCUMENTS 0592128 4/1994 European Pat. Off. .

OTHER PUBLICATIONS

H.T.Kung, "Why Systolic Architectures?", Computer, vol. 15, Jan. 1982, pp. 37–46.

A Family of VLSI Designs for the Motion Compensation Block–Matching Algorithm; Kun–Min Yang, Ming–Ting Sun and Lancelot Wu; 1989; pp. 1317–1325.

Array Architectures for Block Matching Algorithms; Thomas Komarek and Peter Pirsch; 1989; pp. 1301–1308.

Zero Waiting–Cycle Heirarchical Block Matching Algorithm and its Array Architectures; Bor–Min Wang, Jui–Cheng Yen and Shyang Chang; 1994; pp. 18–28.

Primary Examiner—Bijan Tadayon
Assistant Examiner—Dmitry A. Novik
Attorney, Agent, or Firm—Antonelli, Terry, Stout & Kraus, LLP

[57] ABSTRACT

A block-matching motion estimation apparatus in the form of linear systolic array architecture. The apparatus includes a selecting unit for inputting data of a reference block and other data to delay the data of the reference data and selectively outputting the data; a delaying unit having P–1 delay elements where the first delay element delays and outputs an output of the selecting unit and the second to (P–1)-th delay elements delay and output outputs of just front delay element, respectively, the P–1 delay element being connected in serial; and a mean absolute difference operating unit for simultaneously inputting data of a search area to each pipe by connecting in parallel P pipes where operation elements are disposed in a linear systolic array architecture, and then calculating a value of mean absolute difference in each of the search areas by inputting outputs of the selecting unit, the first delay element, and the (P–1)-th delay element to the first pipe, the second pipe, and the (P-th) pipe, respectively.

2 Claims, 3 Drawing Sheets

BLOCK-MATCHING MOTION ESTIMATION APPARATUS UNDER USE OF LINEAR SYSTOLIC ARRAY ARCHITECTURE

BACKGROUND OF THE INVENTION

1. Field of the Invention

The present invention relates to a block-matching motion estimation apparatus used with a linear systolic array architecture for a full-search motion estimation operation, or a hierarchical-search motion estimation operation.

2. Description of the Related Art

The motion estimation apparatus according to the prior art is limited in its search range. Therefore, the motion estimation apparatus according to the prior art has had problems in that it is incongruent with any system which must search a wide range. Therefore, in order to perform a motion estimation operation for a wide search range, it is desirable that a plurality of chips are used in parallel by dividing the total motion search areas, or it is desirable that the system is implemented based on a method that one chip repeatedly executes the search operation for each search area. However, under such a situation, there may arise problems in that hardware is very large in its size and time taken in performing such operations is very long.

Further, in the motion estimation apparatus according to the prior art, because the operation speed of internal operation elements is the same as the speed at which data is provided from outside, there may arise therein another problem in that the speed of the internal operation element is limited by the external data supplying speed.

SUMMARY OF THE INVENTION

It is therefore, an object of the invention to provide a block-matching motion estimation apparatus capable of providing a wider search area by using a linear systolic array architecture, as compared with the prior art, reducing the speed of external data supply without slowing down the internal operation of processing elements, and thus improving the overall motion estimation function.

To achieve the above object, the block-matching motion estimation apparatus according to the present invention comprises selecting means for inputting both delayed and undelayed data of a reference block, and then selectively outputting the inputted data in turn; delaying means having P−1 delay elements where the first delay element delays and outputs an output of the selecting means, and the second through {(P−1)-th} delay elements delay and output outputs of the immediately preceding delay elements, respectively, the P−1 delay element being connected in serial; and a mean absolute difference operating means for simultaneously inputting data of a search area to each pipe by connecting in parallel P pipes where operation elements are disposed in a linear systolic array architecture, and then calculating a value of mean absolute difference in each of the search areas by inputting outputs of the selecting means, the first delay element, and the {(P−1)-th} delay element to the first pipe, the second pipe, and the (P-th) pipe, respectively.

BRIEF DESCRIPTION OF THE DRAWINGS

The above and other objects, advantages and features of the present invention will be more apparent from the following detailed description taken with the attached drawings in which.

DETAILED DESCRIPTION OF THE PREFERRED EMBODIMENT

In the following description, the specific details are set forth to provide a more thorough understanding of the present invention. It will be apparent, however, to one skilled in the art, that the present invention may be practiced without these specific details. In other instances, well known features have not been described in detail so as not to obscure the present invention.

Figure 1:
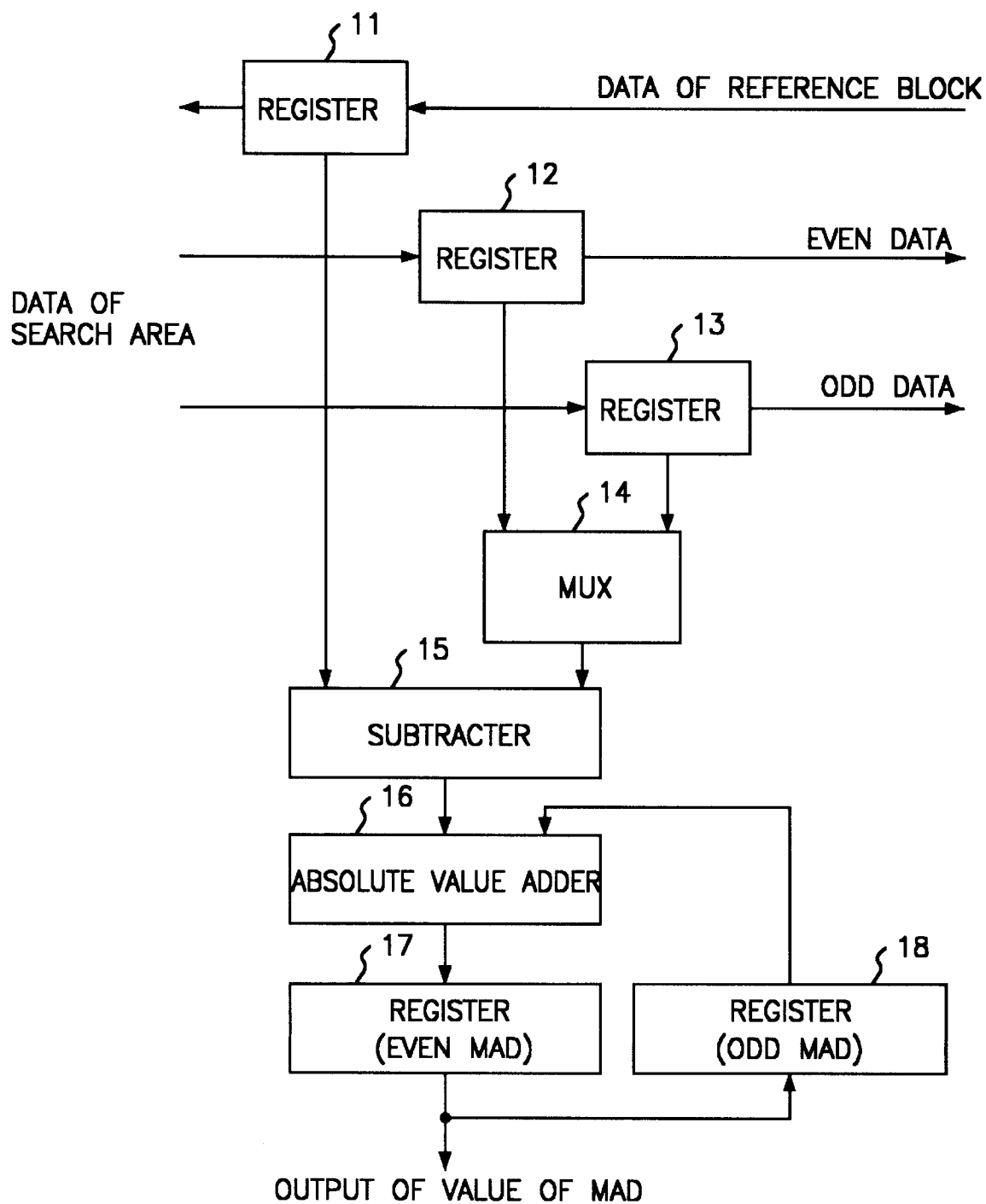
FIG. 1 is a configuration diagram of a basic operation element used for calculating a value of mean absolute difference during a motion estimation operation according to the present invention.

FIG. 1 is a configuration diagram of an operation element for calculating a value of MAD (Mean Absolute Difference) between two adjacent displacement locations in a search area.

Referring to FIG. 1, the operation element has a first shift register 11, second and third shift registers 12 and 13, a MUX 14, a subtracter 15, an absolute value adder 16, and first and second registers 17 and 18. The first shift register 11 stores one of pixel values of a reference block, and also shifts a pixel value of the stored reference block to an adjacent operation element every clock. The second and third shift registers 12 and 13 store pixel values of even and odd columns of the search area, and also shift the pixel values of the stored even and odd columns to the adjacent operation element every clock. The MUX 14 selects either the even column or the odd column of the search area outputted from the second and third shift registers 12 and 13. The subtracter 15 inputs outputs of the first shift register 11 and the MUX 14, and then obtains a difference value from the two pixel values. The absolute value adder 16 receives an output of the subtracter 15, takes an absolute value of the output and adds it to the intermediate value shifted out from the shift register. 18, to thereby obtain the total value. The first and second registers 17 and 18 store values of the MAD in the even and odd columns, respectively.

Figure 2:
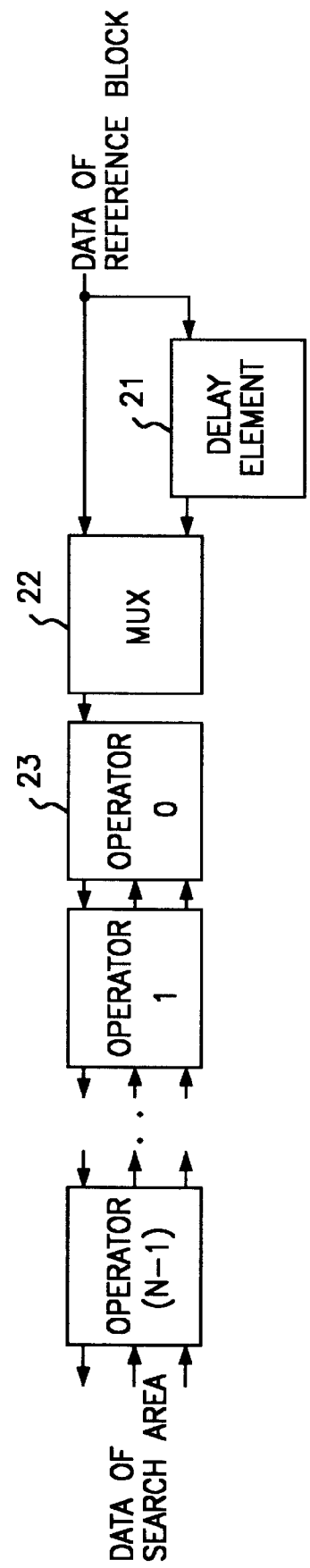
FIG. 2 is a pipe configuration diagram of a linear systolic array architecture using a basic operation element according to the present invention.

The operation element performs an operation for one pixel value every clock cycle, and also alternately executes another operation for the MAD in the even and odd columns every clock. Therefore, it takes 128 clock cycles for a calculation operation of the MAD for the reference block consisting of 64 pixels, i.e., 8×8, so that it is possible to obtain two MAD values for two horizontally contiguous displacement locations. In the meantime, as shown in FIG. 2, MAD values for 2N displacement locations can be calculated by connecting N operation elements in a linear manner.

Table <1> shows an index for data of the reference block and the search area. Table <2> shows a data flow and timed operation of each operation element when the N is given as 4.

<TABLE 1>

(a) data of the reference block

| | | | |
|---|---|---|---|
| C(0,0) | C(0,1) | C(0,2) | C(0,3) |
| C(1,0) | C(1,1) | C(1,2) | C(1,3) |
| C(2,0) | C(2,1) | C(2,2) | C(2,3) |
| C(3,0) | C(3,1) | C(3,2) | C(3,3) |

(b) data of the search region

| | | | | | | | | | |
|---|---|---|---|---|---|---|---|---|---|
| S(0,0) | S(0,1) | S(0,2) | S(0,3) | S(0,4) | S(0,5) | S(0,6) | S(0,7) | S(0,8) | S(0,9) |
| S(1,0) | S(1,1) | S(1,2) | S(1,3) | S(1,4) | S(1,5) | S(1,6) | S(1,7) | S(1,8) | S(1,9) |
| S(2,0) | S(2,1) | S(2,2) | S(2,3) | S(2,4) | S(2,5) | S(2,6) | S(2,7) | S(2,8) | S(2,9) |
| S(3,0) | S(3,1) | S(3,2) | S(3,3) | S(3,4) | S(3,5) | S(3,6) | S(3,7) | S(3,8) | S(3,9) |
| S(4,0) | S(4,1) | S(4,2) | S(4,3) | S(4,4) | S(4,5) | S(4,6) | S(4,7) | S(4,8) | S(4,9) |
| S(5,0) | S(5,1) | S(5,2) | S(5,3) | S(5,4) | S(5,5) | S(5,6) | S(5,7) | S(5,8) | S(5,9) |
| S(6,0) | S(6,1) | S(6,2) | S(6,3) | S(6,4) | S(6,5) | S(6,6) | S(6,7) | S(6,8) | S(6,9) |
| S(7,0) | S(7,1) | S(7,2) | S(7,3) | S(7,4) | S(7,5) | S(7,6) | S(7,7) | S(7,8) | S(7,9) |

<TABLE 2>

| | PE 3 | | PE 2 | | PE 1 | | PE 0 | |
|---|---|---|---|---|---|---|---|---|
| | path_e | path_0 | path_e | path_0 | path_e | path_0 | path_e | path_0 |
| 0 | S(0,0) | | | | | | | |
| 1 | S(0,0) | | S(0,0) | | | | | |
| 2 | S(1,0) | | S(0,0) | | S(0,0) | | | |
| 3 | S(1,0) | | S(1,0) | | S(0,0) | | S(0,0) | |
| 4 | S(2,0) | | S(1,0) | | S(1,0) | | C(0,0)–S(0,0) | |
| 5 | S(2,0) | | S(2,0) | | C(0,0)–S(1,0) | | S(1,0) | |
| 6 | C(0,0)–S(2,0) | | C(1,0)–S(2,0) | S(1,0) | | | | |
| 7 | C(0,0)–S(3,0) | | C(1,0)–S(3,0) | S(2,0) | S(2,0) | | | |
| 8 | S(4,0) | S(0,1) | C(1,0)–S(3,0) | | S(3,0) | | C(2,0)–S(2,0) | |
| 9 | C(1,0)–S(4,0) | S(0,1) | S(4,0) | S(0,1) | C(2,0)–S(3,0) | | S(3,0) | |
| 10 | S(5,0) | S(1,1) | C(2,0)–S(4,0) | S(0,1) | S(4,0) | S(0,1) | C(3,0)–S(3,0) | |
| 11 | C(2,0)–S(5,0) | S(1,0) | S(5,0) | S(1,1) | C(3,0)–S(4,0) | S(0,1) | S(4,0) | C(0,0)–S(0,1) |
| 12 | S(6,0) | S(2,1) | C(3,0)–S(5,0) | S(1,1) | S(5,0) | C(0,0)–S(1,1) | S(4,0) | C(0,10)–S(0,1) |
| 13 | C(3,0)–S(6,0) | S(2,1) | S(6,0) | C(0,0)–S(2,1) | S(5,0) | C(0,10)–S(1,1) | S(5,0) | C(1,0)–S(1,1) |
| 14 | | C(0,0)–S(3,1) | S(6,0) | C(0,1)–S(2,1) | S(6,0) | C(1,0)–S(2,1) | S(5,0) | C(1,1)–S(1,1) |
| 15 | | C(1,0)–S(3,1) | | C(1,0)–S(3,1) | C(1,1)–S(6,0) | S(6,0) | S(2,1) | C(2,0)–S(2,1) |
| 16 | S(0,2) | C(1,0)–S(4,1) | | C(1,1)–S(3,1) | | C(2,0)–S(3,1) | S(6,0) | C(2,1)–S(2,1) |
| 17 | S(0,2) | C(1,1)–S(4,1) | S(0,2) | C(2,0)–S(4,1) | | C(2,1)–S(3,1) | | C(3,0)–S(3,1) |
| 18 | S(1,2) | C(2,0)–S(5,1) | S(0,2) | C(2,1)–S(4,1) | S(0,2) | C(3,0)–S(4,1) | | C(3,10)–S(3,1) |
| 19 | S(1,2) | C(2,1)–S(5,1) | S(1,2) | C(3,0)–S(5,1) | S(0,2) | C(3,1)–S(4,1) | C(0,1)–S(0,2) | S(4,1) |
| 20 | S(2,1) | C(3,0)–S(6,1) | S(1,2) | C(3,1)–S(5,1) | C(0,1)–S(1,2) | S(5,1) | C(0,2)–S(0,2) | S(4,1) |
| 21 | S(2,1) | C(3,1)–S(6,1) | C(0,1)–S(2,2) | S(6,1) | C(0,2)–S(1,2) | S(5,1) | C(1,1)–S(1,2) | S(5,1) |
| 22 | C(0,1)–S(3,2) | | C(0,2)–S(2,2) | S(6,1) | C(1,1)–S(2,2) | S(6,1) | C(1,2)–S(1,2) | S(5,1) |
| 23 | C(0,2)–S(3,2) | | C(1,1)–S(3,2) | | C(1,2)–S(2,2) | S(6,1) | C(2,1)–S(2,2) | S(6,1) |
| 24 | C(1,1)–S(4,2) | S(0,3) | C(1,2)–S(3,2) | | C(2,1)–S(3,2) | | C(2,2)–S(2,2) | S(6,1) |
| 25 | C(1,2)–S(4,2) | S(0,3) | C(2,1)–S(4,2) | S(0,3) | C(2,2)–S(3,2) | | C(3,1)–S(3,2) | |
| 26 | C(2,1)–S(5,2) | S(1,3) | C(2,2)–S(4,2) | S(0,3) | C(3,1)–S(4,2) | S(0,3) | C(3,2)–S(3,2) | |
| 27 | C(2,2)–S(5,2) | S(1,3) | C(3,1)–S(5,2) | S(1,3) | C(3,2)–S(4,2) | S(0,3) | S(4,2) | C(0,2)–S(0,3) |

<TABLE 2>-continued

| | PE 3 | | PE 2 | | PE 1 | | PE 0 | |
|---|---|---|---|---|---|---|---|---|
| | path_e | path_0 | path_e | path_0 | path_e | path_0 | path_e | path_0 |
| 28 | C(3,1)–S(6,2) | S(2,3) | C(3,2)–S(5,2) | S(1,3) | S(5,2) | C(0,2)–S(1,3) | S(4,2) | C(0,3)–S(0,3) |
| 29 | C(3,2)–S(6,2) | S(2,3) | S(6,2) | C(0,2)–S(2,3) | S(5,2) | C(0,3)–S(1,3) | S(5,2) | C(1,2)–S(1,3) |
| 30 | | C(0,2)–S(3,3) | S(6,2) | C(0,3)–S(2,3) | S(6,2) | C(1,2)–S(2,3) | S(5,2) | C(1,3)–S(1,3) |
| 31 | | C(0,3)–S(3,3) | | C(1,2)–S(3,3) | S(6,2) | C(1,3)–S(2,3) | S(6,2) | C(2,2)–S(2,3) |
| 32 | S(0,4) | C(1,2)–S(4,3) | | C(1,3)–S(3,3) | | C(2,2)–S(3,3) | S(6,2) | C(2,3)–S(2,3) |
| 33 | S(0,4) | C(1,3)–S(4,3) | S(0,4) | C(2,2)–S(4,3) | | C(2,3)–S(3,3) | | C(3,2)–S(3,3) |
| 34 | S(1,4) | C(2,2)–S(5,3) | S(0,4) | C(2,3)–S(4,3) | S(0,4) | C(3,2)–S(4,3) | | C(3,2)–S(3,3) |
| 35 | S(1,4) | C(2,3)–S(5,3) | S(1,4) | C(3,2)–S(5,3) | S(0,4) | C(3,3)–S(4,3) | C(0,3)–S(0,4) | S(4,3) |
| 36 | S(2,4) | C(3,2)–S(6,3) | S(1,4) | C(3,3)–S(5,3) | C(0,3)–S(1,4) | S(5,3) | C(0,4)–S(0,4) | S(4,3) |
| 37 | S(2,4) | C(3,3)–S(6,3) | C(0,3)–S(2,4) | S(6,3) | C(0,4)–S(1,4) | S(5,3) | C(1,3)–S(1,4) | S(5,3) |
| 38 | C(0,3)–S(3,4) | | C(0,4)–S(2,4) | S(6,3) | C(1,3)–S(2,4) | S(6,3) | C(1,4)–S(1,4) | S(5,3) |
| 39 | C(0,4)–S(3,4) | | C(1,34) | S(3,4) | C(1,4)–S(2,4) | S(6,3) | C(2,3)–S(2,4) | S(6,3) |
| 40 | C(1,3)–S(4,4) | S(0,5) | C(1,4)–S(3,4) | | C(2,3)–S(3,4) | | C(2,4)–S(2,4) | S(6,3) |
| 41 | C(1,4)–S(4,4) | S(0,5) | C(2,3)–S(4,4) | S(0,5) | C(2,4)–S(3,4) | | C(3,3)–S(3,4) | |
| 42 | C(2,3)–S(5,4) | S(1,5) | C(2,4)–S(4,4) | S(0,5) | C(3,3)–S(4,4) | S(0,5) | C(3,4)–S(3,4) | |
| 43 | C(2,4)–S(5,4) | S(1,5) | C(3,3)–S(5,4) | S(1,5) | C(314)–S(4,4) | S(0,5) | S(4,4) | C(0,4)–S(0,5) |
| 44 | C(3,3)–S(6,4) | S(2,5) | C(3,4)–S(5,4) | S(1,5) | S(5,4) | C(0,4)–S(1,5) | S(4,4) | C(0,5)–S(0,5) |
| 45 | C(3,4)–S(6,4) | S(2,5) | S(6,4) | C(0,4)–S(2,5) | S(5,4) | C(0,5)–S(1,5) | S(5,4) | C(1,4)– |

The data of the search area is divided into two. The data of the even column and that of the odd column are provided to the operation elements PE_0~PE_3 through paths path_e and path_0, respectively. When a point of time is given as 0, i.e., T=0, a first data (S(0,0)) of the search area is applied to a unit operation element PE_3 from outside. Thereafter, one new data is provided for two cycles. On the other hand, the data of the reference block, as shown in FIG. 2, is provided in opposite direction to that of the search area. When a point of time is given as N-1, i.e., T=N-1 (referred to as T=3, in Table <2>), the first data is supplied.

In the same manner as the data of the search area, one new data of the reference block are provided for two cycles. Thereby, the data which is changed in every clock cycle under use of a delay element 21 and a MUX 22, is generated, and is then provided to each operation element. Meantime, after initial clock cycles during which the necessary data is supplied is completed, all operation elements achieve 100 percent utilization efficiency. Further, the successive operations have maximum operation efficiency by being made as pipe line. Notice here again, the supplying speed of the data from outside is half as fast as the operating speed of the internal operation element.

Figure 3:
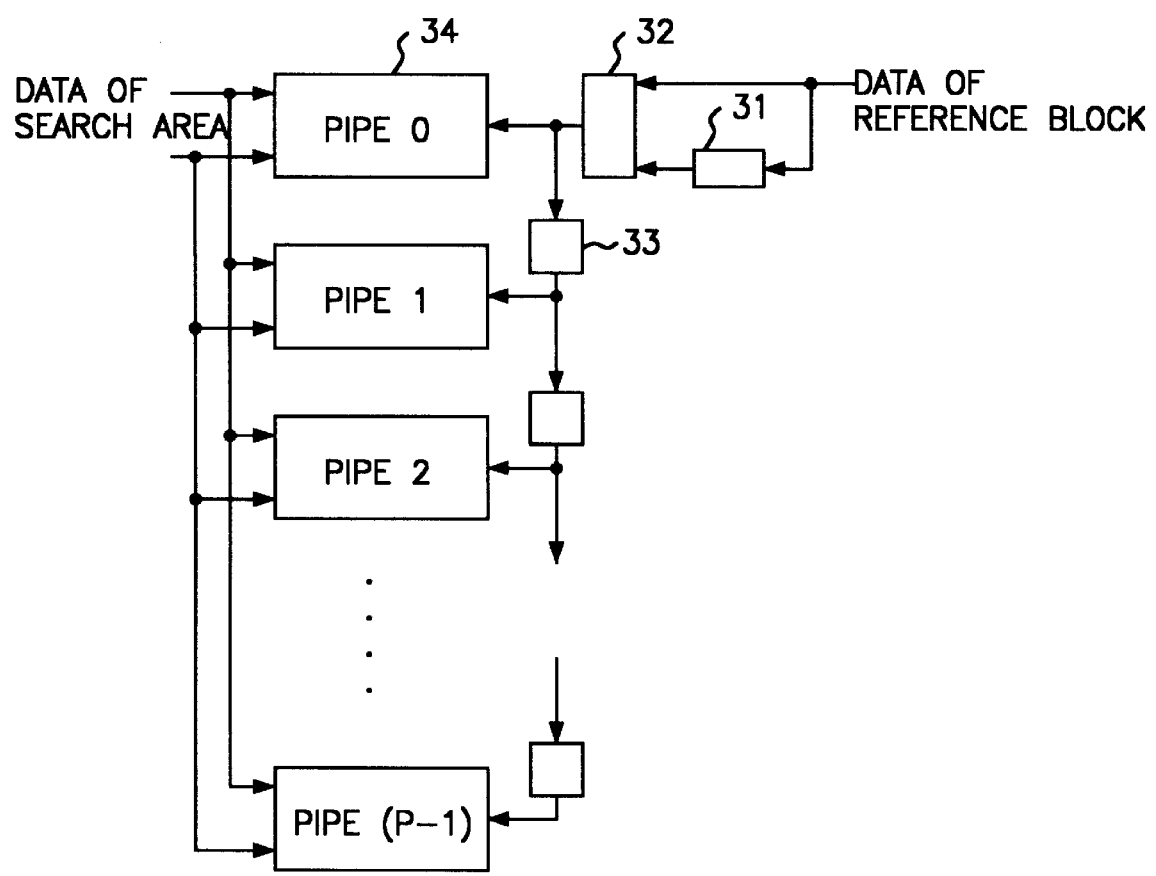
FIG. 3 is a configuration diagram of a block-matching motion estimation apparatus under use of a linear systolic array architecture according to the present invention.

FIG. 3 is a configuration diagram of a block-matching motion estimation apparatus under use of a linear systolic array architecture according to the present invention.

As shown in FIG. 3, the data of the search area is simultaneously provided to the all pipes and that of reference block is provided through delay elements 33 which are constantly disposed between each pipe. At this point, each of the operation elements of a pipe 0 34 is intended to calculate the value of the MAD between two locations adjacent in the horizontal direction, and also is intended to calculate another value of the MAD for N locations in the vertical direction.

For example, the operation element 0 of the pipe 0 having four operation elements is employed to calculate the values of MAD(0, 0) and MAD(0, 1), the operation element 1 the values of MAD(1, 0) and MAD(1, 1), the operation element 2 the values of MAD(2, 0) and MAD(2, 1), and the operation element 3 the values of MAD(3, 0) and MAD(3, 1), respectively.

Also, each of the operation elements of the pipe 1 is subjected to calculate the value of the MAD between two columns which are adjacent to each other in the horizontal direction, i.e, MAD(0~3, 2) and MAD(0~3, 3).

Accordingly, in the motion estimation operation architecture consisting of P pipes, as shown in FIG. 3, the value of the MAD for N×2P displacement locations can be efficiently calculated.

In drawings, a reference numeral 32 represents the MUX for selectively outputting one of two input data per clock cycle in turns and reference numerals 31 and 33 represent delay elements having the sizes of 2N and 4N, respectively.

Therefore, according to the block-matching motion estimation apparatus of the present invention, it is possible for the operation element to calculate the values of the MADs within short time. Further, in accordance with the block-matching motion estimation apparatus of the present invention, the supplying speed of the external data is half as fast as the operable speed of the internal operation element. Furthermore, in the present invention, all operation elements achieve 100 percent utilization efficiency after the initial data is provided. Accordingly, there is provided an efficiency in the present invention in that a wider area can be searched, as compared with the prior art. Moreover, according to the present invention, there is provided further efficiency in that the speed of external data supply is reduced without slowing down internal operation of processing elements and the overall motion estimation operation is improved.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A block-matching motion estimation apparatus under use of a linear systolic array architecture, for which a basic search area is (2P×N), wherein P is an integer greater than 1 and N is a multiple of 2, said apparatus comprising:

means for simultaneously inputting even column search area data and odd column search area data separately into one end of every one of plural linear systolic arrays from a memory;

selecting means for selectively inputting reference block data, delaying said reference block data, and inputting the delayed input reference block data into another end of a first one of said linear systolic arrays;

delaying means having P−1 delay element for supplying further delayed input reference block data to each remaining one of said linear systolic arrays, wherein a first delay element delays and outputs an output of said selecting unit and second to (P−1)-th delay elements delay and output outputs of an immediately preceding delay element, respectively, said P−1 delay elements being connected serially; and mean absolute difference operating means having P linear systolic arrays, wherein each linear systolic array includes operation elements disposed in a linear systolic array architecture, for calculating means absolute difference values in a 2×N search area of the entire 2P by N search area.

2. A block matching motion estimation apparatus under use of a linear systolic array architecture as claimed in claim 1, wherein said mean absolute difference operating means comprises:

a delay element for delaying input reference block data by two N−1 clock cycles;

a selecting device for selectively inputting said input and delayed reference block data; and N operation elements disposed in linear systolic array architecture.

* * * * *

UNITED STATES PATENT AND TRADEMARK OFFICE
CERTIFICATE OF CORRECTION

PATENT NO.    : 5,946,405
DATED         : August 31, 1999
INVENTOR(S)   : Jin Woong KIM, et al.

It is certified that error appears in the above-identified patent and that said Letters Patent is hereby corrected as shown below:

On the title page:

Under Item [73]: Delete the listed Assignees and insert the following:
--Electronics and Telecommunications Research Institute,
Seoul, Rep. of Korea--.

Signed and Sealed this

Twenty-first Day of November, 2000

Attest:

Q. TODD DICKINSON

*Attesting Officer*           *Director of Patents and Trademarks*